May 11, 1965  C. E. COOK  3,182,374
METHOD OF AND APPARATUS FOR MOLDING CONCRETE
BUILDINGS MONOLITHICALLY
Filed Feb. 8, 1961  6 Sheets-Sheet 1
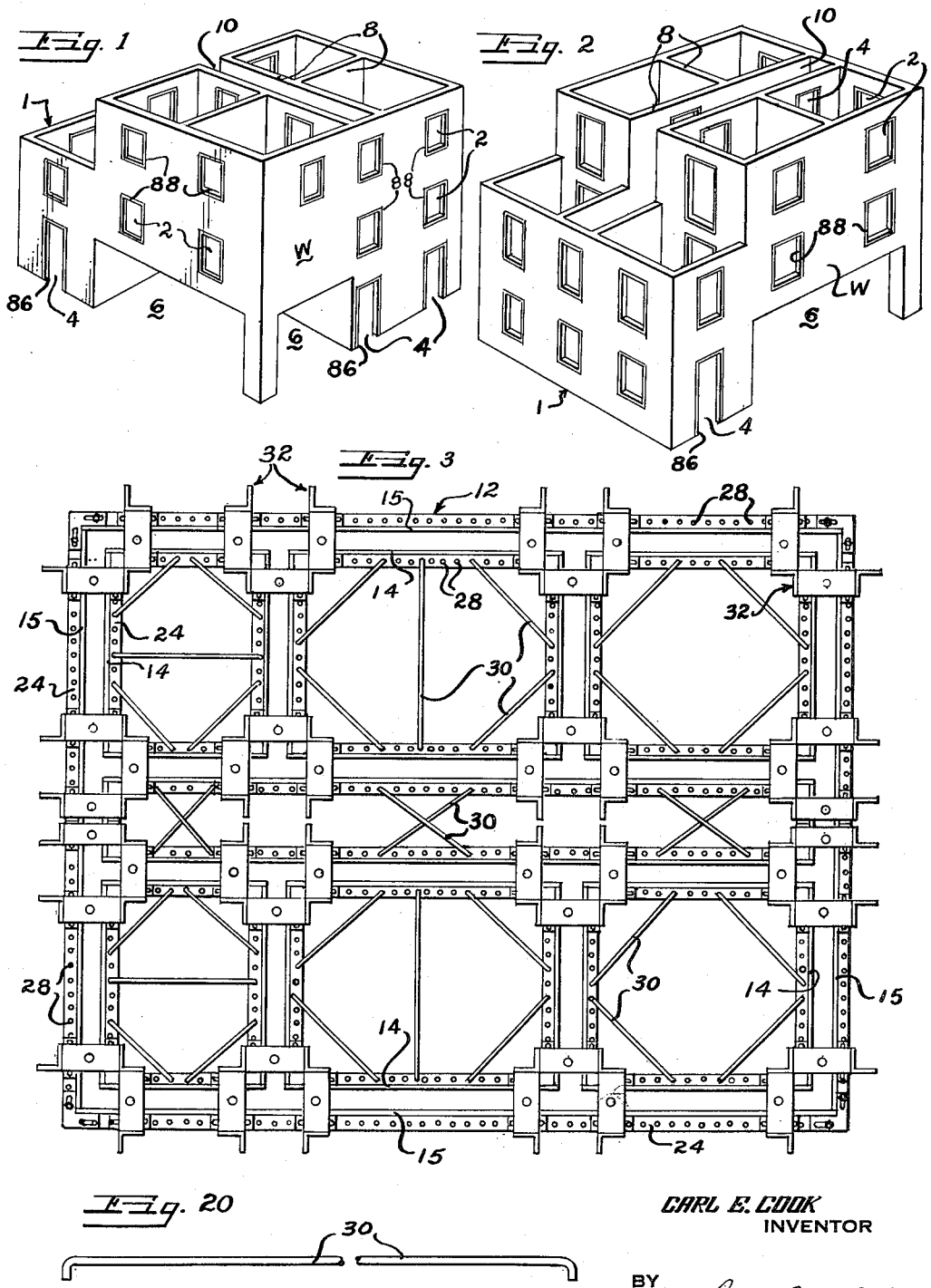
CARL E. COOK
INVENTOR
BY
Wayland D. Keith
HIS AGENT

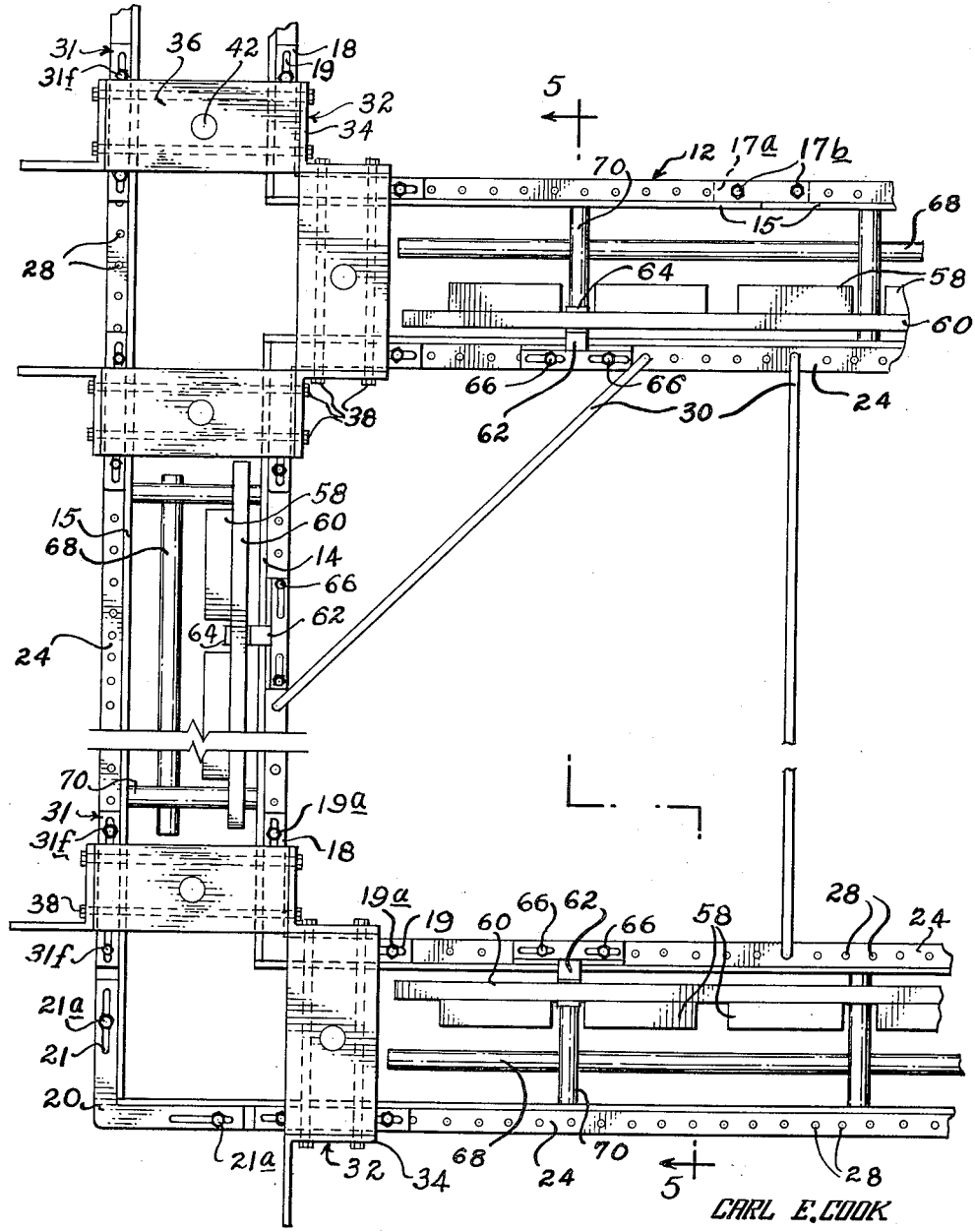

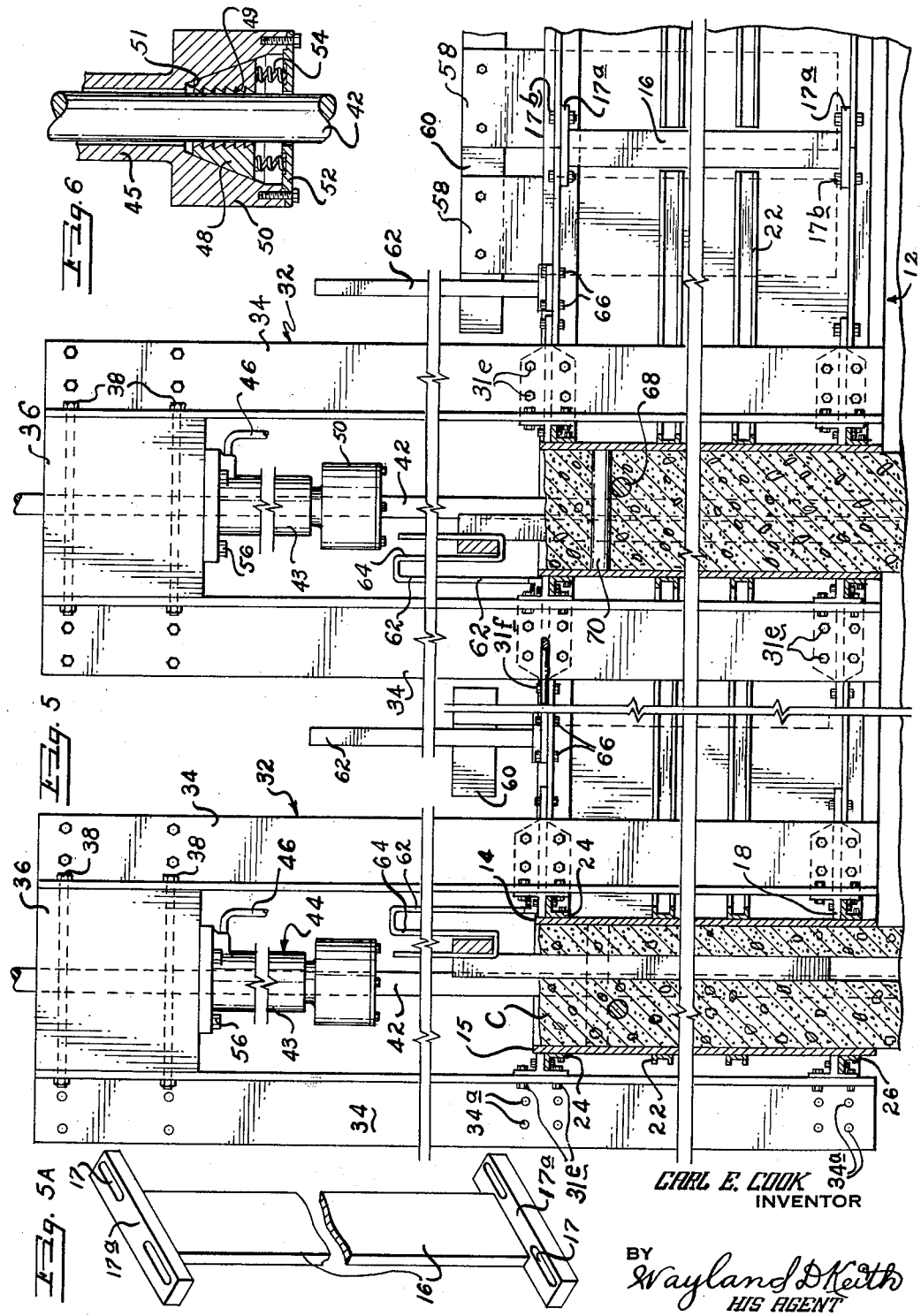

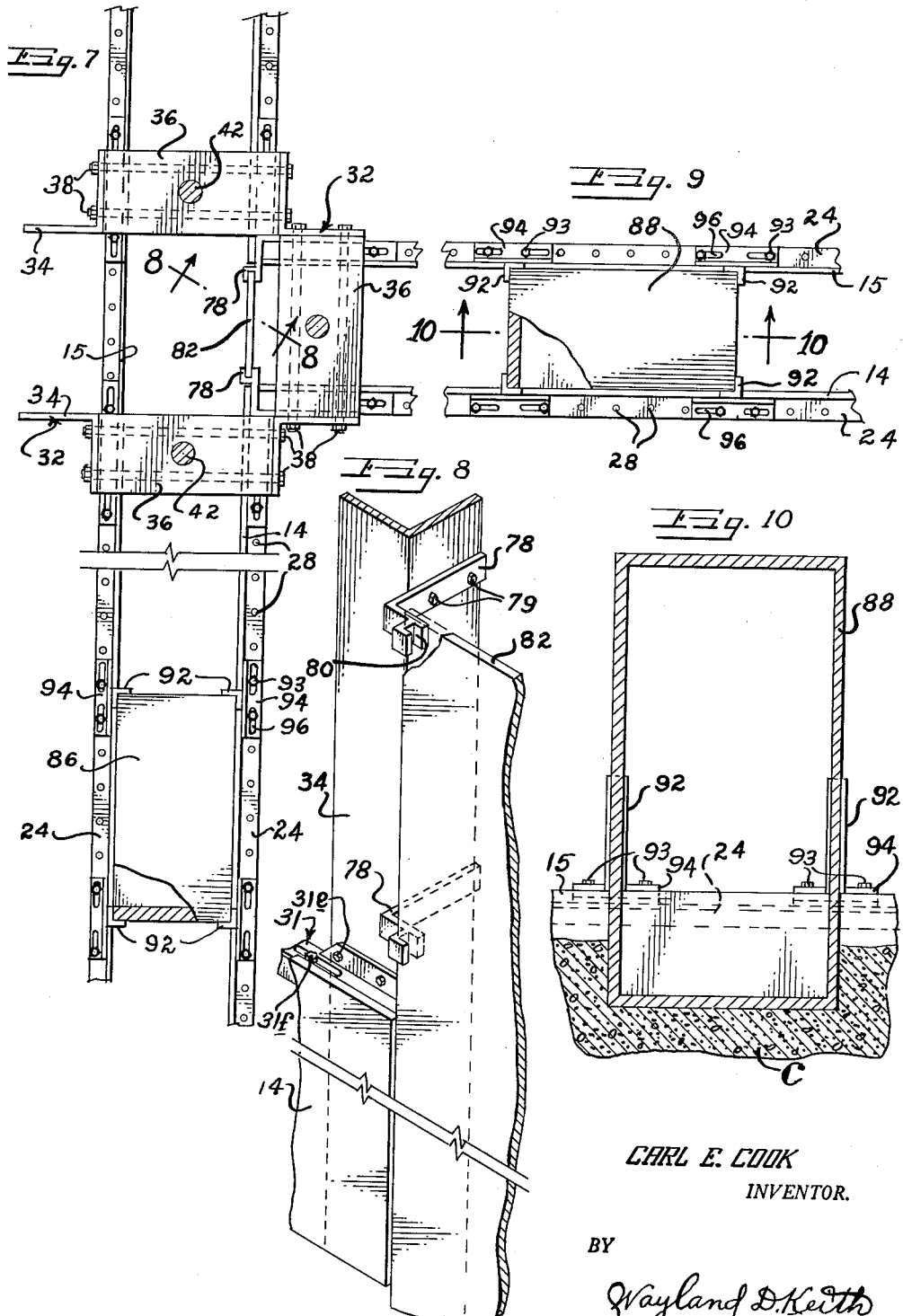

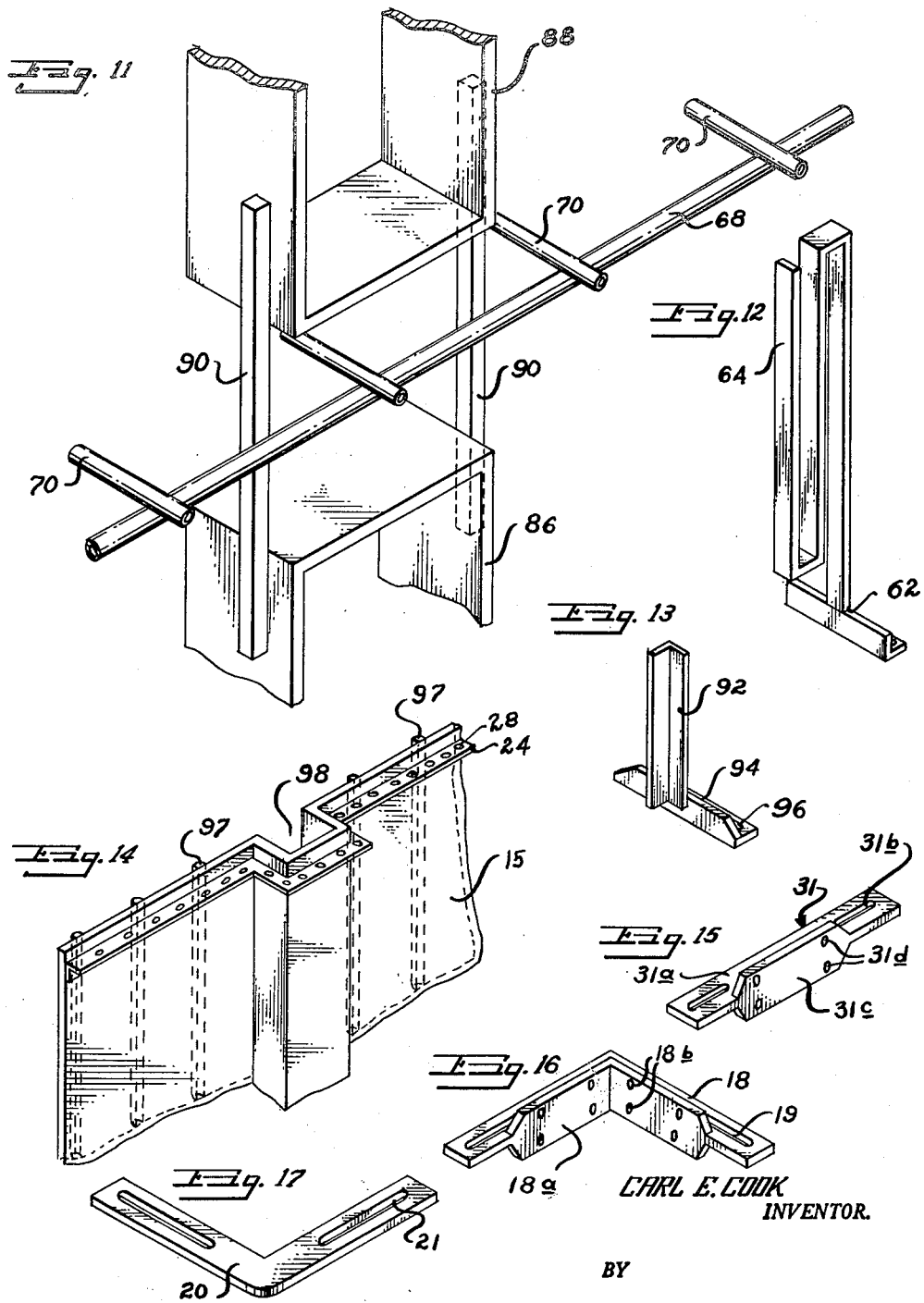

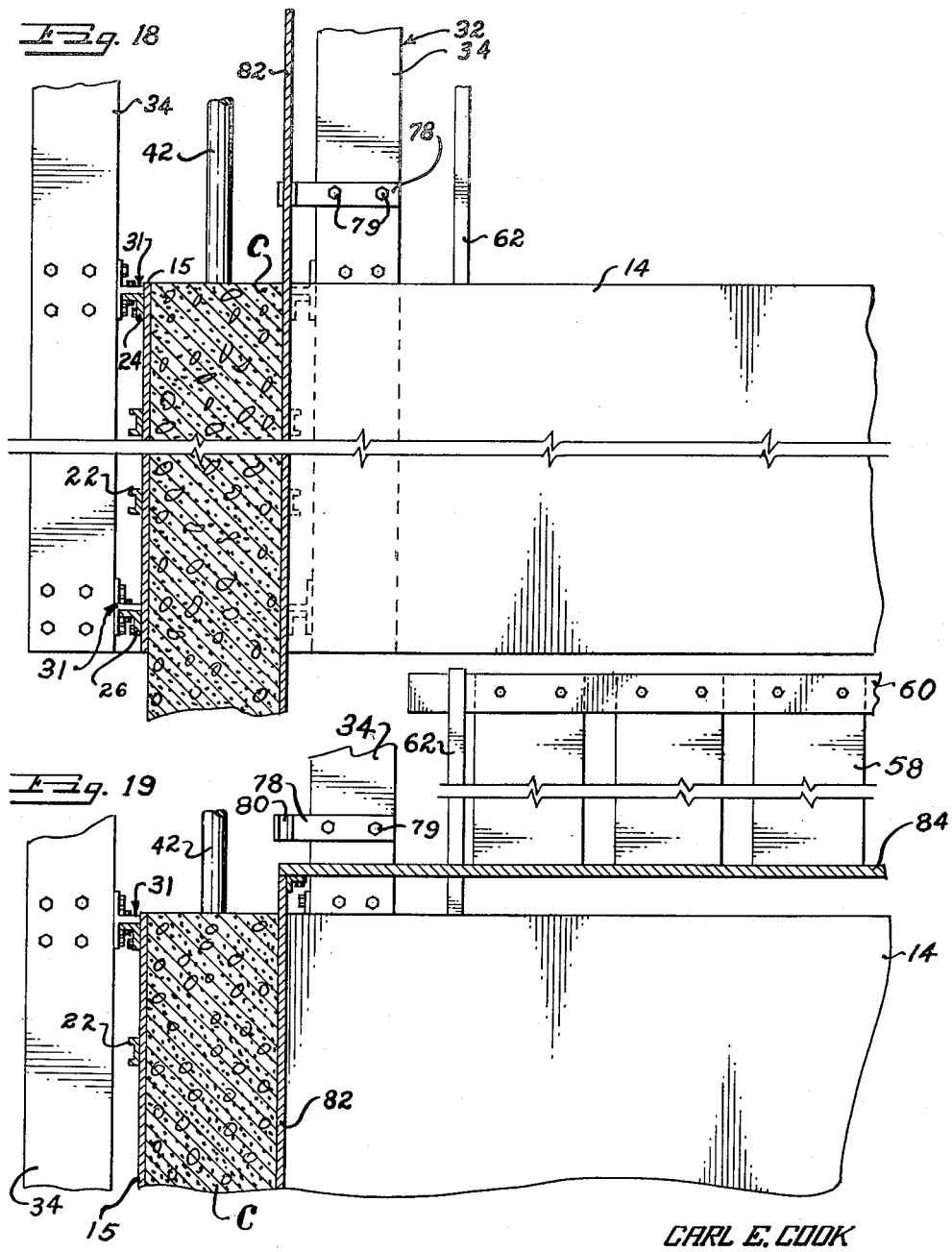

United States Patent Office 3,182,374
Patented May 11, 1965

3,182,374
METHOD OF AND APPARATUS FOR MOLDING
CONCRETE BUILDINGS MONOLITHICALLY
Carl E. Cook, 1345 Turner St., Borger, Tex.
Filed Feb. 8, 1961, Ser. No. 87,962
8 Claims. (Cl. 25—131)

This invention relates to improvements in an apparatus for and method of constructing monolithic, concrete buildings, and more particularly to relatively small, traveling forms for molding concrete into a unitary, monolithic building structure to any predetermined height, in place on the site, by the use of such forms, which forms are so designed as to give, to the molded concrete building, special characteristics which are incorporated into the building as it is being molded, such as partition walls, window and door openings, large open spaces within the walls, as well as means being provided within the walls for anchoring floor or ceiling to the walls to form a rigid building structure.

Various methods of and apparatus for molding concrete houses have been proposed heretofore, but these for the most part, required molds of considerable size, which required heavy equipment for handling the molds. The present apparatus for molding a concrete building may be readily assembled, is relatively light in weight, and may be readily disassembled for transportation thereof from job to job, without the use of heavy crane equipment for handling the molds.

The present apparatus for and method of constructing a monolithic, concrete house, in place on the site, provides for flexibility of construction which is usually inherent only in custom concrete forms. The present device is so constructed as to enable the insertion of reinforcing members, and frames for windows, as the construction proceeds, so as to enable the construction of a rigid, permanent type building, in a minimum of time.

An object of this invention is to provide apparatus for and method of molding a monolithic, concrete building structure of any desired height, by the utilization of a concrete form which is moved upward as the lower portion of the concrete cures.

Another object of the invention is to provide an apparatus for molding a monolithic, concrete house or building, which apparatus may be readily adjusted to enable the molding of partition walls to form rooms of different size, simultaneously with the molding of the exterior walls.

A further object of the invention is to provide an apparatus for molding monolithic, concrete walls, for a building in a continuous manner with a traveling form.

Another object of the invention is to provide an apparatus for molding monolithic, concrete buildings in a continuous manner, wherein openings, such as windows and doors may be molded into a unitary structure.

A still further object of this invention is to provide a movable molding device to form walls of a monolithic, concrete building in a continuous manner, which mold is light in weight, low in the cost of manufacture and the use of which mold enables the walls of a building to be speedily constructed at a relatively low cost.

With these objects in mind and others which will become manifest as the description proceeds, reference is to be had to the accompanying drawings in which like reference characters designate like parts in the several views thereof, in which:

FIG. 1 is a perspective view of one form of a monolithic building molded with the molding apparatus in accordance with the method of the present invention;

FIG. 2 is a perspective view similar to FIG. 1, but taken at substantially a right angle thereto;

FIG. 3 is a top plan view of a mold form for molding a building similar to that shown in FIGS. 1 and 2;

FIG. 4 is an enlarged, fragmentary, top plan view of a portion of the concrete molding form with portions broken away and other parts being shortened to bring out the details of construction;

FIG. 5 is a fragmentary, elevational section taken on the line 5—5 of FIG. 4, looking in the direction indicated by the arrows, with parts broken away and with parts shortened and with parts shown in elevation to bring out this details of construction;

FIG. 5A is an enlarged, perspective view of a combination reinforcing and concrete form sheet joining member, with parts broken away and with parts shortened;

FIG. 6 is an enlarged, fragmentary, sectional view through a portion of the lower end of the hydraulic ram of the lifting jack, and showing rod engaging slips therein with a rod shown in elevation fitted therein;

FIG. 7 is a top plan view of a modified form of the concrete molding forms, showing certain elements for performing specific operations during the molding of a monolithic concrete building;

FIG. 8 is a fragmentary, perspective view taken on the line 8—8 of FIG. 7, looking in the direction indicated by the arrows, and showing a method of blocking off a wall when not needed;

FIG. 9 is a top plan view of a portion of the molding form for molding the concrete walls and showing an apparatus for and method of inserting a window frame into the wall being molded;

FIG. 10 is a sectional view taken on the line 10—10 of FIG. 9, looking in the direction indicated by the arrows, and showing a window receiving frame in place within the concrete mold;

FIG. 11 is a fragmentary, perspective view of a portion of a door frame and of a window frame secured to a reinforcing member with the frames being spaced apart in vertical relation as by welding, and showing the reinforcing member as having ceiling and/or floor anchor members welded thereto;

FIG. 12 is a perspective view of a fixture for supporting coring fingers within the concrete form;

FIG. 13 is a perspective view of a fixture for holding door and/or window frames in place during the process of molding the walls;

FIG. 14 is a fragmentary, perspective view of a portion of the mold form for molding the walls and the like, and showing elements thereon to give special decorative effects and to cast pilasters in the walls as the walls are being molded;

FIG. 15 is a perspective view of an adapter member which enables straddle braces and jack support members to be attached to the upper and lower sides of each of the concrete mold forms;

FIG. 16 is a perspective view of an interior corner concrete form connecting member;

FIG. 17 is a perspective view of an exterior corner concrete form connecting member;

FIG. 18 is an elevational view, with parts shown in section of a modified form of concrete molding form, as shown in FIGS. 7 and 8, and also showing the upper and lower portions of the traveling concrete molding form, with a reinforcing member and a jack support member extending upward therefrom, and showing parts broken away and other parts being shortened;

FIG. 19 is a sectional view, somewhat similar to FIG. 18, but showing a horizontal blocking off form in place and showing coring fingers resting thereon preparatory to extending the wall upward, with parts being broken away and with parts shortened; and FIG. 20 is an elevational view, with parts broken away, of a transverse brace.

With more detailed reference to the drawings, the numeral 1 designates generally a monolithic, concrete house or building constructed in accordance with the teachings of the present invention, windows 2, doors 4, open portion 6, as well as partition walls 8, and halls or corridors 10 are constructed simultaneously, to individual custom order, as the building is molded of monolith construction by an upwardly moving or traveling concrete form, which is designated generally by the numeral 12 in FIG. 3.

The buildings, as shown in FIGS. 1 and 2, are shown to be three stories for a portion of the height thereof, and two stories for a portion of the height thereof, with certain portions of the walls being "blanked off" in order to show the versatility of constructing a building with the present apparatus, which utilizes the method of continuously pouring concrete into the form, and continuously moving the forms upwardly, but at a sufficiently slow rate to permit the lower portion of the concrete to set, thereby obviating the necessity of providing forms to cover a substantial portion or all of the building, before the pouring of concrete into the forms has begun.

The forms for molding the concrete comprise inner form sheets 14 and outer form sheets 15, which sheets are made of metal, preferably in modular lengths and of uniform widths, so that the sheets, when joined in end to end relation, as by form connectors designated generally at 16, or are joined at the corners by interior connectors 18, or exterior connectors 20, the sheets can be formed into a form of given length to provide a form for the exterior surface of a portion of the wall to be poured, and by joining similar sheets or shorter lengths a form is provided for the inner surface of the wall to be molded, and form connectors 18 are provided at the corner juncture of the inner form sheets 14, and form connectors 20 are provided at the corner juncture of outer form sheets 15 to form a composite mold. Each of the connectors 16 has slots 17 formed in the bars 17a thereof, a bar 17a being attached at each end of each connector 16, which slots allow differences in the thickness of metal to be compensated for or to allow for other unforseen dimensional contingencies.

The form connectors 18 and 20, respectively have respective slots 19 and 21 formed therein, which slots perform a function similar to the slots 17.

The form sheets 14 and 15 each have spaced apart reinforcing members 22 secured thereto in such manner as to extend longitudinally of the respective sheets 14 and 15, and are welded or otherwise secured thereto. The reinforcing members 22 enable the use of a relatively light gauge metal for the form sheets, but still maintain the surfaces of the wall being molded substantially planar. The respective upper and lower edges of the respective form sheets 14 and 15 have the respective out-turned angle members 24 and 26 secured thereto as by welding, which angle members have holes 28 formed therethrough at spaced intervals throughout the length thereof to enable form joining members 16 to be secured thereto to join sheets 15 in end to end relation and to join sheets 14 in end to end relation, and to enable corner form members 18 and 20 to be secured thereto so as to hold form sheets 14 and 15 respectively, in predetermined relation to each other.

The holes 28 formed in angle members 24 and 26 are also adapted to receive the down-turned ends of transverse braces 30, which braces are adapted to maintain the form sheets 14, which form the inner surfaces of the walls, in a predetermined, transverse, spaced apart relation, and also to maintain the form sheets 14 at the respective corners at a right angle to each other, if such angle is desired, or at such other angle as is desired.

Straddle brace connectors, designated generally at 31, are each preferably formed of a T-shaped member, with the respective stems 31a having slots 31b formed therein and the respective flanges 31c each having holes 31d formed therein. The slots 31b are adapted to receive bolts therethrough and through the holes 28 of angle members 24 and 26, which angle members are secured to the respective form sheets 14 and 15 to enable the straddle brace connectors 31 to be secured at any convenient place within the length of angle members 24 and 26 on form sheets 14 and 15, except at the ends of form sheets 14 which meet at an angle to form an interior corner, whereupon, corner brace members 18 are used to perform the dual function of connecting form sheets together and to provide a flange 18a with holes 18b therein for the connecting of the inverted U-shaped members, designated generally at 32, and which, for the sake of brevity, will hereinafter be referred to as straddle braces, the connection of which will be brought out in more detail hereinafter.

The outer form sheets, designated at 15, form the retaining members for the concrete at the outside of the wall and the inner sheets, designated at 14, retain the concrete within the forms, but for all practical purposes of description these form sheets are identical. By having these form sheets in modular lengths, increments of length can be made by form sheets of certain lengths to be so fitted together as to provide forms of the necessary length to form exterior walls. Other form sheets can be secured into forms as necessary to form partition walls, and when desired, at the second or subsequent story levels, the partition forms can be manipulated to change the room sizes, but the exterior wall forms will be maintained at the predetermined length, or shortened as desired.

The form sheets which are used to form the exterior walls are spaced apart by straddle braces 32, as these braces straddle the inner and outer form sheets 14 and 15. These straddle braces 32 are each composed of spaced apart angle members 34, each of which members 34 has holes formed therein, with a perforate spacer element 36 being secured therebetween at one end thereof by bolts 38 which pass through holes in the angle members 34 and apertures in spacer elements 36, which bolts tightly secure the angle members 34 in fixed relation. These members 34 may be maintained parallel, if desired, it is usually preferable to have these members 34 to extend downwardly and to diverge slightly so when form sheets 14 and 15 are secured thereto by connectors 18 and 31, the lower parts of the form sheets 14 and 15 will be spaced apart a greater distance than at the top. This will enable the form to move upwardly more readily and without sticking.

The straddle brace connectors 31 have the holes 31d formed in the flange 31c in such manner as to register with holes 34a within angle members 34, which enables the straddle brace connectors 31 to be readily secured to the angle members 34 anywhere within the length of respective angles 24 and 26 on form sheets 14 and 15. However, the holes 28 are punched in angles 24 and 26 in a uniform spacing so that the straddle brace may be attached to the angles by straddle brace connectors 31 at any point within the length thereof or at the respective junctures therebetween.

Straddle braces 32 are connected at the corners of the form sheets and the inner corner members 18 have the flanges 18a thereof apertured as indicated at 18b so that the apertures thereof will register with the apertures 34a within angle members 34. However, the exterior angle 24 on sheet 15 may use a straddle brace connector 31 to form the joining unit to be able to connect the outer angle member 34 to angles 24 and 26.

Each spacer element 36 has a vertical hole 40 formed therein to receive a vertical jack rod 42, which jack rod also serves as a reinforcing member. The rods 42 are of such length as to extend from the lower portion of the wall being poured to a distance above spacer elements 36, which rod extends upward through a jack, which is generally designated by the numeral 44. The jack 44, in the present instance, is shown to be a hydraulic jack, which has a hydraulic conduit 46 leading to a central pumping unit, where one or more pumps may be located to supply hydraulic fluid to the jacks in a manner well understood in the art of hydraulics. While the jacks have been shown and described as being hydraulic jacks, it is to be understood that any conventional jack, having an axial opening therethrough, may be used, so long as the rod engaging members 48 is provided thereon to grip the rod 42, to enable the straddle brace 32 to which the respective jacks 44 are attached, to be moved upward with respect to the rod 42. The jack 44 is shown to have pipe or rod engaging slips 48 therein, which slips are preferably divided into three or more elements which are circumferentially positioned around rod 42, and which taper to a wedge shape to complementally engage within a conical seat 51 within head 50 of jack 44.

A plate 52 is disposed on the lower end of head 50 of jack 44, with a relatively weak spring 54 interposed between the plate and the lower end of slips 48, so as to urge the slips upward against the force of gravity into engagement with the conical seating surface 51 and to urge the teeth 49 into contact relation with the rod 42. Upon upward movement of the plunger 45 of jack 44, the slips 48 will move downward in conical seat 51, whereupon the slips 48 will move outward so the teeth 49 will slide along the rod 42. However, the teeth are so arranged that, upon relative downward movement of the plunger 45, the springs 54 will urge the slips 48 upward into seat 51 which complementally engages the outer wedge surface of slips 48 and will move the teeth 49 of the slips 48 into engagement with rod 42 to bite into the rod, whereupon, the downward movement of the plunger 45 will be arrested, which will cause the body portion 43 of jack 44 to move upward, and with the jack 44 attached to spacer elemnet 36 by bolts 56, the spacer element 36 and angle members 34, as well as form sheets 14 and 15, which are attached to angle members 34, will be moved upward. When the exterior wall mold has been formed from spaced apart form sheets 14 and 15, and partition wall molds are formed by spaced apart form sheets 14–15, as set out above, concrete C is poured thereinto. When the lower portion of the concrete C is sufficiently set, the form may be moved slightly upward by applying hydraulic pressure to the respective jacks 44. When certain of the jacks have reached the length of the respective strokes, the pressure on certain alternate jacks may be released and a resilient element (not shown) within the jack will move the jack into retracted position, substantially as shown in FIG. 5. As the jack retracts, the "bite" of the teeth 49 into rod 42 is released, which will permit ready movement of the plunger 45 upward with respect to rod 42. When the plunger has reached the uppermost position of travel, pressure may be applied to these alternate jacks, which will cause the teeth 49 to engage the rod 42 and hold the forms against downward movement, while the other alternate jacks are moved through a similar cycle. In this manner the weight of the forms may be maintained against downward movement, and since it takes only a short period of time to perform this operation, the pouring can continue and then the movement of the forms by the jacks 44 is repeated.

If so desired, the jacks 44 may be operated so that alternate jacks 44 are moving the form sheets 14 and 15 upward, while the plungers of the other alternate jacks 44 are being retracted, and upon retraction of the plungers 45 of the last mentioned jacks, these can be set in motion to raise the straddle braces 32 and the form sheets 14 and 15 attached thereto, while the first-mentioned jacks are being retracted. In this manner the forms can be kept moving continuously, while the pouring of concrete C into the upper portion of the form is being done in a continuous manner. The form sheets 14 and 15 are of such width, and the rate of upward movement of the hydraulic jacks is so timed that the concrete in the lower portion of the form is sufficiently cured and/or set to be self-sustaining, as the form moves upward. In this manner, walls of any height may be cast in the forms, within the structural limitations of reinforced concrete.

Reinforcing members 42, which are upstanding rods or pipes, may be used in conventional lengths, and additional lengths welded or otherwise secured to the upper ends of the respective rods 42, as the height of the building progresses, as the rods 42 are supported against lateral bending below the jacks 44, because of the curing or setting of the concrete therearound. The walls W of the building are formed monolithically, by the concrete C, which walls may be cast of solid concrete, either of the conventional type, or of a light weight aggregate, such as scoria, pumice or the like, or the walls may also be cast monolithically with vertical cores formed therein. The vertical cores may be formed in the walls being formed by downwardly extending fingers 58 (FIGS. 4 and 5) which are secured to the respective header bars 60.

The header bars 60 are loosely supported on U-shaped support members 64, which support members are bolted to the top of angles 24 by means of bolts 66, so that the U-shaped portion 64 of the support member 62 will support the header bar 60 and the fingers or cores 58 which are attached thereto to extend downward at the desired place in the concrete C being poured into the form to form the wall W of the building, so vertical holes will be formed in the walls in predetermined spaced relation to the faces thereof.

Horizontal reinforcing rods 68 and transverse spacers 70 (FIG. 11), which are welded thereto, are positioned at spaced intervals throughout the height of the wall to be built. The transverse spacers 70 may be hollow and threaded, so that sills or headers may be secured thereto, as by bolts, to enable the ready construction of ceilings and floors or of outstanding awnings on the exterior of the building. In addition to the horizontal bracing members 22, braces 16 are provided at the juncture of the form sheets 14 and at the juncture of foam sheets 15, and may be provided at spaced intervals throughout the length of the form formed by the respective sheets 14 and 15. When positioned at the juncture of the respective sheets, the vertical braces 16 will prevent concrete from escaping from joints between the ends of the sheets, should the ends be spaced apart, and the bars 17a—17a, which are secured in abutting relation on the respective ends of each brace 16, are so spaced apart as to engage and hold the angle members 24 and 26, respectively, in secure braced relation. The bars 17a—17a each have slotted holes 17—17, respectively, formed therein, which holes are adapted to register with the holes 28 in the respective angle members 24 and 26, so as to enable moving the angle members 24 and 24 and 26 and 26, respectively, endwise as much as one of the spaces between holes 28 in the respective angle members 24 and 26, to enable the adjustment of the members to compensate for slight dimensional irregularities.

When it is desired to block off the partition wall, such as shown in FIGS. 7, 8, and 18, brackets 78 are bolted to angle members 34, a spaced distance above sheets 14 so that brackets on opposed angle members 34 will have their channel portions in adjacent relation, whereupon a blocking-off sheet 82, of material, such as a board or a sheet of metal, is placed vertically in the channels 80 of the brackets 78 so as to exclude the concrete being poured from the walls from passing into the space blocked-off by the sheet or board 82. In this manner the board 82 will remain stationary, as the angle members 34 and sheets 14 and 15 move upward until the height of the block-off is reached, whereupon, if it is so desired, a horizontal block-off sheet or board 84, may be positioned on top of the block-off sheet or board as the forms move upward, concrete can be poured on top of the horizontal block-off board or sheet 84, which is shown diagrammatically in FIG. 19, for purposes of illustration, however, the horizontal block-off board 84 will be sufficiently reinforced and braced therebelow to withstand the concrete load which will be placed thereupon.

After the horizontal concrete block-off board 84 has been put in place, it may be desirable to extend another partition wall upward, at the next level above the space where the partition wall would have been had this wall not been blocked out, or, if desired, the forms may be alternated at this point to position a partition wall at any desired place within the length of the outside wall. In this manner the forms are not limited to a set pattern, but may be changed at each floor level to accommodate the particular requirements of the particular floor plan being constructed. As the building proceeds upward, windows 2 or doors 4 may be formed therein by positioning a door frame member, such as indicated at 86, between the forms, and if desired to have a window thereabove, a frame 88 may be secured thereabove by reinforcing members 90, which reinforcing members 90 are secured to horizontal reinforcing members 68, as by welding, and other transverse reinforcing members 70 are secured in place as by welding to horizontal reinforcing members 68, thus the window and door frames are securely anchored within the concrete being poured, and as the form moves upward, the outer and inner edges of the respective door and window frames 86 and 88 will form a tight seal with the sheets 14 and 15 of the concrete forms, so as to prevent concrete from entering into the openings in which the windows and doors 2 and 4 will occupy. Furthermore, the transverse brace members 70 are cut to a length to be the thickness of the concrete wall being poured. In this manner, the forms or sheets will move upward over the ends of these members, however, when desired, the ends of the members 70 can be located, and screw-threaded bolts used to fasten horizontal beams thereto to enable the constructing of floors, ceilings, and the like.

The window frames and the door frames are placed in the forms as the pouring proceeds, and with the form sheets 14 and 15 moving upward thereabout. Upstanding angle guide members 92 are bolted, at spaced intervals, to the top of angle members 24, as shown in FIGS. 9, 10, 11, and 13, so that the door and window frames will be in free sliding relation therewith, as the mold moves upward, and the upright angle members 92 will maintain the door and window frames 86 and 88, respectively, in plumbed relation. The base portion 94 of the upright angle guide members 92 are slotted at 96, as indicated in FIG. 9, so that the base may be shifted to accommodate the particular width window or door frames to be fitted thereinto. However, the holes 28, within angle members 24, are so spaced that, when combined with slots 96, may be moved to accommodate window or door frames of any width.

If it is desired, special decorative effects may be created on the exterior wall by the use of concrete pilasters at spaced intervals, which will increase the strength of the walls, or the exterior form sheets may have vertical ribs 97 formed therein, which ribs may be shaped as desired, such as being semi-cylindrical or rectangular, and which ribs may be attached to the inner side of the particular outer form sheet, so when the concrete form sheets are moved upward, a vertical ribbed effect will be formed on the exterior of the wall, which will give a decorative effect to any portion of the wall desired.

If desired, pilasters may be formed exterior of the wall being poured, by having the sheet deformed so as to project outward to form a recess 98 within the exterior wall form sheet, which deformed recess will receive concrete therein as the form moves upward, and will form a pilaster which may be reinforced by rods 42, to increase the strength of the building, which is especially desirable if the building is to be of substantial height. The elongated vertical strips 87 are secured to the inner face of mold form sheets 15 at spaced apart intervals so as to form grooves in the wall, either exterior or interior, as the mold form sheet is moved upward. While pilasters and grooved effects may be formed on the exterior wall, as described above, the same procedure may be practiced for the interior facing of the walls, if so desired.

After the building is constructed, the door and window frames 86 and 88, respectively, serve as frames to receive the door and shutters, and window and sashes respectively. Therefore, upon completion of the pouring of the walls of the building, the greater portion of the work is completed, whereupon doors and window sashes may be installed in the respective openings. Ceilings and floors may be secured to the already prepared hangers, then the building roofed and decorated ready for occupancy, thereby saving much time and expense. This method of construction enables the building of low-cost housing or building units in a fraction of the time usually required by conventional methods.

While the concrete forms have been described in some detail, these can be modified and changed to mold walls of different thickness, to form rooms of different size and shape, and other structural changes may readily be made, once the form is set up and the initial concrete poured thereinto, and allowed to harden or set sufficiently to sustain the weight that will be added thereabove. The concrete may be poured into the space provided to form the walls in a continuous manner, and the concrete form moved upward by means of jacks 44 in a continuous or substantially continuous manner, with the lower portion of the concrete hardening as the new concrete is poured into the space provided to form the walls, between sheets 14 and 15. The manner of elevating concrete above the top of form sheets 14 and 15, for pouring therebetween is well known in the art of construction, and while individual builders may alter the method somewhat, to perform in accordance with their specific needs and requirements, the detailed manner of pouring will not be set out herein.

After the concrete walls have been poured to the desired height, and such anchor rods 42, as desired, cut off to the desired height thereabove, to which anchor rods 42, beams or girders may be secured, the concrete is permitted to set until it will be self-supporting, whereupon, the straddle braces 32 may be detached from the forms, and the forms removed by unbolting the sections and lowering these to the ground. After the forms have been removed from the building constructed, these may be transported to another building site and reassembled to form a building of the size and shape house or building desired. It is preferable to have the from sheets of modular lengths to give any desired length for an exterior wall or for an interior wall, without the necessity of cutting or altering the forms.

After the horizontal block-off board 84 has been placed in place, the walls may be cored, if desired, by bolting support member 62 to angle 24 by means of bolts 66, so the U-shaped member 64 will cradle the header 60 which has fingers 58 attached thereto so that the lower end of fingers 58 will rest on horizontal block-off board 84, whereupon a plastic mass of concrete C is poured into the cavity formed by mold form sheets 14 and 14 or mold form sheets 14 and 15 until the mold form is filled to the desired height with plastic concrete. Whereupon the mold forms will be moved upward as hereinbefore set out until the lower portion of the U-shaped member 64 engages the lower side of header member 60, and since the mold form has been moved upward progressively, the lower portion of the concrete has become set. This will enable the further upward movement of the mold forms and support members 62 to engage header 60 and move the header 60 and fingers 58 upward simultaneously with the movement of the mold forms as the concrete C is being poured into the cavity formed in the mold sheets. In this manner, vertically cored walls can be formed to the desired height, in the manner hereinbefore set out.

While the apparatus has been illustrated and described in some detail, it is to be understood that changes may be made in the minor details of construction and adaptations made to different applications without departing from the spirit of the invention or the scope of the appended claims.

Having thus clearly shown and described the invention, what is claimed as new and desired to be secured by Letters Patent is:

1. An apparatus for molding a monolithic concrete building structure, which apparatus comprises inner and outer, spaced apart, upright, movable form sheets to form a cavity the thickness of the wall to be poured, said respective inner and outer form sheets being joined at a right angle to form a rectangular mold of a size and shape to define the exterior wall plan of said building structure, pairs of upright members secured to said inner and outer mold form sheets and extending upwardly, connecting members, which connecting members connect said upright members in spaced apart, rigid, abridging relation at the upper ends thereof and forming vertically movable straddle braces, each connecting member having a vertical aperture formed therethrough, each said aperture being adapted to receive an upright support member therein, jack members, each said jack member having an axial opening formed therethrough, one said jack member being secured to each said connecting member and surrounding one said upright support member, U-shaped support means secured to the upper side of only one of said mold form sheets, a horizontal header bar, core forming fingers secured to said horizontal header bar, said horizontal header bar being supported on said U-shaped support means so said core forming fingers extend downward between said inner and outer form sheets, said fingers being movable with said inner and outer form sheets, and means selectively actuating certain of said jack members to move said upright members, said inner and outer form sheets and said core forming fingers progressively upward.

2. An apparatus for molding a monolithic concrete building structure as defined in claim 1; wherein horizontally disposed reinforcing members are positioned within said mold, vertical reinforcing members are attachably secured to said horizontal reinforcing members, and rectangular form members are rigidly secured to said upright support members so the width of the respective members of said rectangular form member is complementary to the thickness of the walls being poured, guide means on said inner and outer form sheets for guiding said rectangular form members in guided relation with respect to said movable form sheets so as to enable the forming of openings within said walls to receive doors, windows, and the like.

3. An apparatus for molding a monolithic concrete building structure as defined in claim 1; wherein the respective upper and lower edges of each mold form sheet has an out-turned flange thereon, which flanges extend outward in the same direction on the respective form sheets, said out-turned flanges having perforations formed therein, and wherein brace rods are diagonally connected to said out-turned flanges by insertion of the rods into the respective perforations of spaced apart sheets so as to brace said sheets in rigid relation.

4. An apparatus for molding a monolithic concrete building structure as defined in claim 1; wherein the respective upper and lower edges of each mold sheet has an out-turned flange thereon, which flanges extend outward in the same direction on the respective form sheets, said out-turned flanges having perforations formed therein, and wherein brace rods are transversely connected to said out-turned flanges on spaced apart mold form sheets by insertion of the rods into the respective perforations of spaced apart sheets so as to abridge said sheets in rigid relation.

5. An apparatus for molding a monolithic building structure from plastic concrete as defined in claim 1; wherein outstanding brackets are secured to at least two of said adjacent angle members forming a straddle brace, which outstanding brackets have inwardly facing grooves formed therein to receive a vertical sheet of material therein in relative sliding relation, which sheet is of a width complementary to the thickness of the wall being poured so as to exclude the plastic concrete from a wall cavity adjacent to a wall cavity being poured, and means maintaining said vertical sheet of material against upward movement upon said inner and outer form sheets moving upward.

6. An apparatus for molding a monolithic concrete building structure as defined in claim 5; wherein a horizontal sheet of material of a width complementary to the thickness of the wall is adapted to be placed on said vertical sheet and to be secured thereto so as to form a block to support concrete thereon.

7. An apparatus for molding a monolithic concrete building structure as defined in claim 1; wherein further wall mold forms are mounted within the confines of the molds forming said first mentioned wall forms with the cavities of said last mentioned wall form interconnecting with the cavities of said first mentioned mold forms so as to form room partition walls within said building structure, said mold forms having straddle braces and jacks thereon which are adapted to move said forms progressively upward in sliding relation as said first mentioned forms are moved upward.

8. An apparatus for molding a monolithic concrete building structure, as defined in claim 1; wherein at least one of said mold form sheets has elongated, vertical configurations thereon adjacent the wall being formed, so as to form an elongated, vertical, complementary pattern on the face of the concrete wall being formed.

References Cited by the Examiner

UNITED STATES PATENTS

| 744,688 | 11/03 | Meyer | 50—470 |
|---|---|---|---|
| 949,521 | 2/10 | Collins | 25—131 |
| 1,033,385 | 7/12 | Cook | 25—131 |
| 1,566,135 | 12/25 | Waugh | 25—131 |
| 1,628,752 | 5/27 | Sproul et al. | 25—131 |
| 1,638,583 | 8/27 | Keller | 25—131 |
| 1,649,674 | 11/27 | Egan | 25—131 |
| 1,851,399 | 3/32 | Miller | 25—131 |
| 1,901,392 | 3/33 | Frederick | 25—131 |
| 2,045,789 | 6/36 | McDowell | 25—131 |
| 2,046,674 | 7/36 | Coates | 25—131 |
| 2,160,489 | 5/39 | Spies | 25—131 |
| 2,313,207 | 3/43 | Steensen | 25—155 |
| 2,491,212 | 12/49 | Robinson | 25—131 |
| 2,617,168 | 11/52 | Johnson | 25—131 |
| 2,706,842 | 4/55 | Keffer | 25—131 |
| 2,806,277 | 9/57 | Hand et al. | 25—155 |
| 2,830,788 | 4/58 | Bentley et al. | 254—106 |
| 2,831,232 | 4/58 | Lawson | 25—121 |
| 2,880,608 | 4/59 | Boll et al. | 25—131 XR |
| 2,944,403 | 7/60 | Smith | 254—106 |

FOREIGN PATENTS 131,691  5/51  Sweden.

MICHAEL V. BRINDISI, *Primary Examiner.*

NEDWIN BERGER, ROBERT F. WHITE, WILLIAM J. STEPHENSON, *Examiners.*